United States Patent Office 3,787,363
Patented Jan. 22, 1974

3,787,363
AROMATIC POLY SULFONES
Philip Anthony Staniland, Welwyn Garden City, and Graham Jarrett, Hitchin, England, assignors to Imperial Chemical Industries Limited, London, England
No Drawing. Filed Dec. 14, 1971, Ser. No. 207,958
Int. Cl. C08g 49/00, 49/04
U.S. Cl. 260—49
5 Claims

ABSTRACT OF THE DISCLOSURE

Aromatic polymeric materials of increased molecular weight are obtained by heating at temperatures between 300° C. and 450° C. a mixture comprising 95 to 99.99% by weight of at least one thermoplastic aromatic polysulphone containing repeat units —Ar—SO$_2$— (where Ar is a bivalent aromatic residue which may vary from unit to unit in the polymer chain and at least some of the Ar units have an aromatic ether group in the polymer chain ortho or para to at least one —SO$_2$— group) and 5 to 0.01% by weight of sulphur present as elemental sulphur, sulphide or disulphide in at least one compound selected from the class consisting of elemental sulphur, aliphatic and aromatic dithiols, and aliphatic and aromatic polydisulphides.

---

This invention relates to aromatic polymers and in particular it relates to mixtures of thermoplastic aromatic polysulphones and certain sulphur compounds and to aromatic polymeric materials of increased molecular weight obtained therefrom.

According to the present invention there is provided a mixture comprising 95 to 99.99% by weight of at least one thermoplastic aromatic polysulphone containing repeat units —Ar—SO$_2$— (where Ar is a bivalent aromatic residue which may vary from unit to unit in the polymer chain and at least some of the Ar units have an aromatic ether group in the polymer chain ortho or para to at least one —SO$_2$— group) and 5 to 0.01% by weight of sulphur present as elemental sulphur, sulphide or disulphide in at least one compound selected from the class consisting of elemental sulphur, aliphatic and aromatic dithiols, and aliphatic and aromatic polydisulphides. According to the invention in another aspect, polymeric materials of increased molecular weight are obtained by heating these mixtures at temperatures between 300° C. and 450° C.

Aromatic polysulphones containing aromatic ether groups in the polymer chain ortho or para to at least one —SO$_2$— group, and methods for making them, are described in British patent specification 1,016,245; 1,060,546; 1,078,234; 1,109,842; 1,122,192; 1,133,561; 1,153,035; 1,153,528, 1,177,183 and 1,234,301 and Netherlands patent specification 7011346, the disclosures of which are incorporated herein by reference.

The aromatic polysulphones described in the above-mentioned specifications comprise repeating units of the formula —Ar—SO$_2$— in which Ar is a bivalent aromatic radical and may vary from unit to unit in the polymer chain (so as to form copolymers of various kinds). The polysulphones having at least some units of the structure

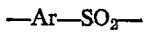

in which Y is oxygen or the residue of an aromatic diol such as a 4,4'-bisphenol are generally thermoplastic. One example of such a polysulphone has repeating units of the formula

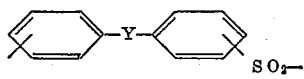

and another (which is commercially available in the United States of America) is said to have copolymerized units in various proportions of the formulae

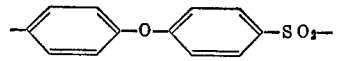

and

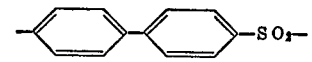

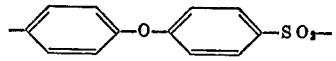

(Minnesota Mining and Manufacturing Company). Aliphatic hydrocarbon radicals are preferably absent from the aromatic polysulphones either as linking groups or aromatic ring substituents. Another group of aromatic polysulphones has repeating units of the formula

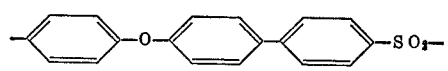

which may be copolymerized with units of other formulae given above.

When elemental sulphur is used as the sulphur compound in the mixture of the invention, sulphur dioxide is evolved on heating and can give rise to a foamed product unless the reaction is carried out under pressure. Of the dithiols, aromatic dithiols of the type HS—R—SH where R is a bivalent aromatic radical are preferred because aliphatic dithiols are generally volatile at the reaction temperature and may liberate hydrogen sulphide as a by-product. Preferred aromatic dithiols are biphenyl-4,4'-dithiol, bis-(4-mercapto phenyl) ether and bis-(4-mercapto phenyl) sulphone. Polydisulphides comprising repeat units having the formula —R—S—S— where R is a bivalent aliphatic and/or aromatic radical may also be used. The weight of sulphur is calculated as the amount of sulphur present as elemental sulphur, sulphide which includes mercaptan and thiol, or disulphide. A preferred range of sulphur content is 0.05 to 2% by weight.

The polymeric materials of increased molecular weight are prepared by heating a mixture of a thermoplastic aromatic polysulphone with a sulphur compound as hereinbefore defined at a temperature between 300° C. and 450° C. preferably between 340° C. and 400° C. At temperatures below 300° C. the reaction is very slow and at temperatures above 450° C., the aromatic polysulphone may begin to decompose.

When the amount of sulphur compound in the mixtures of the invention is more than 0.1% and the reaction time and temperature are sufficiently high, the polymeric materials obtained are cross-linked and essentially insoluble in solvents for thermoplastic aromatic polysulphones and are not thermoplastic although (at temperatures above the glass transition temperature of the thermoplastic aromatic polysulphone from which they are derived) they are similar in physical behavior to rubbers.

If the amount of sulphur compound in the mixtures of the invention is less than 0.1%, or if the reaction time or temperature are lower than required for cross-linking, the polymeric materials obtained may still be thermoplastic, although of increased molecular weight, and soluble in solvents for the polysulphone precursors.

Compared with the thermoplastic aromatic polysulphone precursor, the materials of increased molecular weight have improved resistance to ageing under stress at elevated temperatures and to stress cracking and crazing in solvents. The "cut through" temperature as hereinafter defined of film of these materials is also higher than that of film composed of the thermoplastic aromatic polysulphone precursor.

In order to prepare the mixtures of the invention, the thermoplastic aromatic polysulphone and the sulphur compound may be mixed as dry powders or in the melt (for example in a mill, a sigma-blade mixer or an extruder) or in solution in a common solvent such as for example dimethyl formamide. The mixing should take place at a temperature below that at which chemical reaction occurs, or if carried out at a higher temperature, for a time such that the effects of the reaction are insignificant. The mixture may then be moulded or formed into any desired shape prior to heating to a temperature at which the polymeric product of the invention is formed.

If the sulphur compound is elemental sulphur, it is preferable that the mixture of the invention is moulded under pressure if an unfoamed or bubble-free moulding is required and that the concentration of elemental sulphur is 1% by weight or less. A foamed product may be prepared if the mixture is heated essentially in the absence of imposed pressure. A preferred concentration range of elemental sulphur is then 1 to 5% by weight if the foam is to be produced using only elemental sulphur. A foamed product may also be prepared by blending the mixture of the invention with a conventional foaming or blowing agent, which preferably reacts between 300° C. and 450° C.

The mixtures of the invention may be used in the manufacture of objects containing the new polymeric materials in the form of components such as, for example heat-resistant foams, mouldings, films and coatings and heat-resistant insulation of electrical conductors.

The invention is illustrated by the following examples, in which the physical properties of the materials were measured as follows:

Reduced viscosity of the polysulphone was measured on a solution in dimethylformamide at 25° C. containing 1 g. of polymer in 100 cm.³ of solution.

The "cut-through" temperature was determined using an apparatus similar to that of ASTM D1676, in which the apparatus had two electrodes comprising uninsulated tensioned copper wire mounted one above the other and separated by a piece of film under test. The upper electrode was subjected to a 1 kg. downward/vertical load and the apparatus was placed in an oven with circulating air having a rate of temperature rise of 5°±1° C. per minute. The temperature at which the film softened sufficiently to allow continuity of circuit between the two electrodes was noted as the "cut-through" temperature.

The "yield strength," "break strength" and "elongation" of the film samples were determined at about 20° C. on an "Instron" TM/M tensile tester having a clamp speed of 20 mm./min. and using a film sample 20 mm. long and 10 mm. wide.

The thermoplastic aromatic polysulphone used in the examples had repeat units of the formula

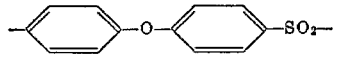

and was prepared in a manner similar to that described in Example 3 of British patent specification 1,153,035.

EXAMPLE 1

A sample (49.5 g.) of thermoplastic aromatic polysulphone having a reduced viscosity of 0.40 was mixed as a powder with elemental sulphur powder (0.5 g.) on a mill at ambient temperature. Samples of the mixture were compression-moulded into film having a thickness of 250 mµ. by pressing the sample between chromium-plated surfaces at 350° C. for 15 minutes. The surfaces were then cooled to 220° C. and the film removed.

The film (A) was tough, slightly yellow and insoluble in dimethyl formamide. Its properties are compared in the following table with those of a film (B) similarly prepared from the aromatic polysulphone in the absence of sulphur.

|  | Film A | Film B |
| --- | --- | --- |
| Treatment with xylene | No crazing | Crazed. |
| Treatment with carbon tetrachloride | do | Do. |
| "Cut-through" temperature | 300° C | 250° C. |
| Tensile strength: |  |  |
| Before ageing | 8.3 kg./mm.² | 8.4 kg./mm.² |
| After ageing in air for— |  |  |
| 14 days at 250° C | 9.2 kg./mm.² | 8.0 kg./mm.² |
| 28 days at 250° C | 9.4 kg./mm.² | Distorted. |
| 28 days at 270° C | 7.0 kg./mm.² | Flowed. |
| Elongation: |  |  |
| Before ageing | 13 percent | 15 percent. |
| After ageing in air for— |  |  |
| 14 days at 250° C | do | 12 percent. |
| 28 days at 250° C | 10 percent | Distorted. |
| 28 days at 270° C | 5 percent | Flowed. |

The results show that film (A) has improved resistance to crazing, higher "cut-through" temperature and better retention of mechanical properties on ageing than film (B).

EXAMPLE 2

Samples (48 g.) of thermoplastic aromatic polysulphone powder (reduced viscosity 0.40) were mixed with powder (2 g.) of biphenyl-4,4'-dithiol, bis-(4-mercaptophenyl) sulphone or bis-4(4-mercaptophenyl) ether, and each mixture was compression-moulded as in Example 1 to give films having thickness 250 µm. The films were not crazed by xylene or carbon tetrachloride. Plaques having thickness 3 mm. were also obtained on compression-moulding the mixtures at 350° C. for 15 minutes.

EXAMPLE 3

Polydisulphide having repeat units of the formula

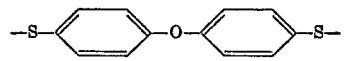

was prepared by the oxidation in air of bis-(4-mercaptophenyl) ether (2 g.) at 25° C., and was blended in powder form with a sample (48 g.) of thermoplastic aromatic polysulphone. The mixture was compression-moulded at 350° C. for 15 minutes and cooled to 220° C. as described in Example 1 to give a film having thickness 250 µm. The film was not soluble in dimethyl formamide.

EXAMPLE 4

Polyethylene disulphide having repeat units of the formula

was prepared by the oxidation in air of ethane-1,2-dithiol (2 g.) in methanol containing sodium hydroxide (0.1% w./w.) at 25° C., and was blended in powder form with a sample (48 g.) of thermoplastic aromatic polysulphone (reduced viscosity 0.40). The mixture was compression-moulded at 350° C. for 15 minutes and cooled to 220° C. as described in Example 1 to give a film having thickness 250 µm. The film was not soluble in dimethyl formamide.

EXAMPLE 5

Lacquers were prepared by dissolving samples (9.6 g.) of thermoplastic aromatic polysulphone (reduced viscosity 0.40) and 4,4'-biphenyl dithiol, bis-(4-mercaptophenyl) sulphone or bis-(4-mercaptophenyl) ether (0.4 g.) in dimethyl formamide (30 cm.³). Sections of copper wire (1 mm. diameter) and aluminium foil (250 µm. thickness) were dip-coated with the lacquer and the solvent was removed by suspending the wire and foil in a stream of nitrogen at 150° C. The dip-coated wire and foil were then placed in an oven at 350° C. for 15 minutes in an atmosphere of nitrogen after which time the wire and foil were found to have a coherent coating, which was insoluble in dimethyl formamide.

EXAMPLE 6

A sample of thermoplastic aromatic polysulphone (reduced viscosity 0.40) was blended in powder form with elemental sulphur (0.25% w./w.). The blend was extruded at 350° C. in an extruder having a dwell time of less than one minute (short compared with the time required for reaction to occur). The extrudate had reduced viscosity 0.40. The extrudate underwent reaction on heating at 350° C. for a further 15 minutes to produce a film similar to that described in Example 1.

A similar extrudate was made from a blend of aromatic polysulphone and elemental sulphur (1% w./w.), but the degree of cross-linking on heating at 350° C. for a further 15 minutes was greater than that in the extrudate containing 0.25% w./w. sulphur as evidenced by lower swelling in dimethyl formamide.

EXAMPLE 7

A film (C) was prepared by the method described in Example 1 except that the aromatic polysulphone had a reduced viscosity of 0.41 and the concentration of elemental sulphur was 1% by weight. The physical properties of the film (C) are compared with those from a similar film (D) prepared from the aromatic polysulphone alone are shown in the following table.

|  | Film C | Film D |
|---|---|---|
| Reaction to xylene | No crazing | Crazed. |
| Reaction to carbontetrachloride | do | Do. |
| Cut-through temperature | 283° C | 250° C. |
| Tensile strength: |  |  |
| Before ageing measured at— |  |  |
| 20° C | 8.3 kg./mm.² | 7.2 kg./mm.². |
| 180° C | 6.0 kg./mm.² | 4.5 kg./mm.². |
| 200° C | 4.7 kg./mm.² | 2.6 kg./mm.². |
| After ageing 28 days at 250° C. measured at 20° C | 9.8 kg./mm.² | 8.1 kg./mm.². |
| Elongation: |  |  |
| Before ageing measured at— |  |  |
| 20° C | 13 percent | 20 percent. |
| 180° C | 12 percent | 7 percent. |
| 200° C | 9 percent | 6 percent. |
| After ageing 28 days at 250° C. measured at 20° C | 12 percent | 14 percent. |

EXAMPLE 8

Extrudate containing elemental sulphur (1% w./w.) prepared according to the method of Example 6, was further heated in an oven in a nitrogen atmosphere at 350° C. for 20 minutes. A foam was produced having density 0.25 g./cm.³. The foam was insoluble in dimethyl formamide, self-extinguishing and did not melt or drip when heated in a gas-flame.

EXAMPLE 9

A powder mixture of thermoplastic aromatic polysulphone and elemental sulphur (1% w./w.) prepared by the method of Example 1 was compression-moulded at 350° C. for 2 minutes between steel plates (12 cm. x 15 cm. x 0.005 cm.) held 2 mm. apart by a third plate. The press was then partially opened so that the polymer melt expanded as a foam to form a layer 8 mm. thick. The foam was held in the press for a further 13 minutes at 350° C. before cooling to 250° C. The sandwich structure comprised the steel plates and the foam which was insoluble, nonthermoplastic and strongly bonded to the steel plates.

EXAMPLE 10

A sample of thermoplastic aromatic polysulphone having a reduced viscosity 0.40 was mixed as a powder with elemental sulphur powder (0.05% w./w.) on a mill at ambient temperature. Samples of the mixture were compression-moulded into film at 350° C. for 5, 10 and 20 minutes respectively. The film was soluble in dimethyl formamide and had reduced viscosities of 0.47; 0.48 and 0.49 respectively.

EXAMPLE 11

A sample of thermoplastic aromatic polysulphone having a reduced viscosity 0.40 was mixed as a powder with elemental sulphur powder (1% w./w.) on a mill at ambient temperature. Samples of the mixture were compression-moulded into film at 320° C. for 5, 10, 15, 20 and 30 minutes. The films formed on compression-moulding for 5, 10 and 15 minutes were soluble in dimethyl formamide and resulting polymers found to have reduced viscosities of 0.40, 0.43 and 0.54 respectively. The films formed on compression-moulding for 20 and 30 minutes were insoluble in dimethyl formamide.

We claim:

1. A mixture comprising 95 to 99.99% by weight of at least one mouldable or film-forming thermoplastic aromatic polysulphone containing repeat units —Ar—SO₂— where Ar is a bivalent aromatic radical which may vary from unit to unit in the polymer chain, at least some of the Ar units having an ether link joining aromatic carbons in the polymer chain ortho or para to at least one —SO₂— group and 5 to 0.01% by weight of sulphur present as at least one member of the class consisting of elemental sulphur, aliphatic and aromatic dithiols, and polymeric oxidation products thereof comprising repeat units of the formula —R—S—S— where R is a bivalent aliphatic or aromatic radical, said mixture forming a polymeric material of increased molecular weight, compared to the molecular weight of said polysulphone, when heated between 300° C. and 450° C.

2. A mixture according to claim 1 in which the aromatic polysulphone contains repeating units of the formula

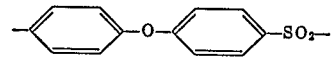

3. A mixture according to claim 1 in which the sulphur is present as elemental sulphur.

4. A mixture according to claim 1 in which the sulphur content is 0.05 to 2% by weight.

5. A mixture according to claim 1 wherein the sulphur is present as elemental sulphur, biphenyl-4,4'-dithiol, bis-(4-mercapto phenyl) ether or bis-(4-mercapto phenyl) sulphone.

References Cited

UNITED STATES PATENTS 3,579,475    5/1971    Jones _____ 260—37

JOSEPH L. SCHOFER, Primary Examiner

C. A. HENDERSON, Jr., Assistant Examiner

U.S. Cl. X.R.

117—128.4, 132 B, 230; 161—213; 260—2.5 R, 79.3 R

UNITED STATES PATENT OFFICE
CERTIFICATE OF CORRECTION

Patent No. 3,787,363     Dated January 22, 1974

Inventor(s) Philip Anthony Staniland et al

It is certified that error appears in the above-identified patent and that said Letters Patent are hereby corrected as shown below:

In the heading Foreign Application Priority Data should be added as follows:

--December 22, 1970     Great Britain     60907/70--

Signed and sealed this 6th day of August 1974.

(SEAL)
Attest:

McCOY M. GIBSON, JR.
Attesting Officer

C. MARSHALL DANN
Commissioner of Patents